Nov. 11, 1924.
C. E. BARNES
STEERING MECHANISM
Filed Dec. 24, 1923
1,515,087
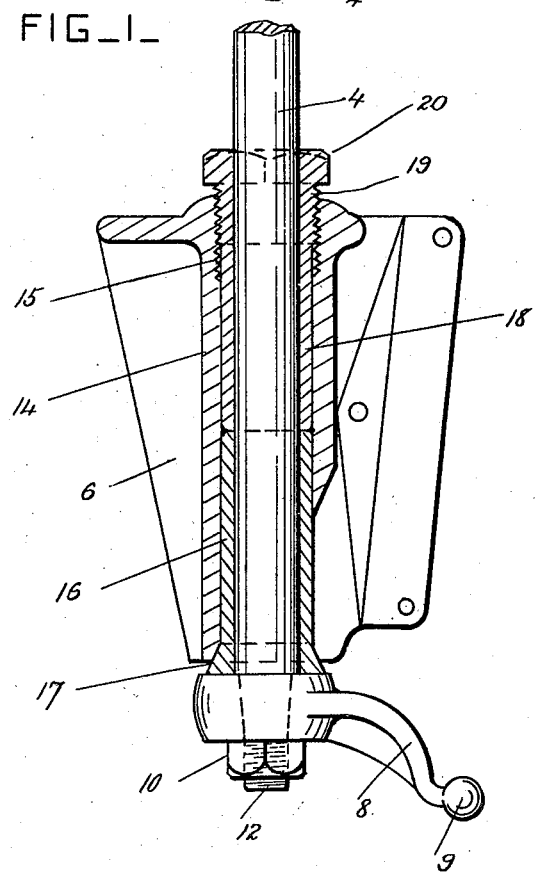

Patented Nov. 11, 1924.

1,515,087

UNITED STATES PATENT OFFICE.

CHARLES E. BARNES, OF ENID, OKLAHOMA.

STEERING MECHANISM.

Application filed December 24, 1923. Serial No. 682,481.

*To all whom it may concern:*

Be it known that I, CHARLES E. BARNES, a citizen of the United States, residing at Enid, in the county of Garfield and State of Oklahoma, have invented certain new and useful Improvements in Steering Mechanism, of which the following is a specification.

This invention relates to steering mechanism for motor cars; and it consists in the novel construction and combination of the parts hereinafter fully described and claimed whereby the steering shaft is prevented from vibrating and whereby the devices ordinarily used are greatly simplified.

In the drawings, Figure 1 is a vertical section through portions of a steering post and steering post bracket provided with steering devices according to this invention. Fig. 2 is a side view of the bush and the sleeve removed from the bracket.

The steering shaft 4 is provided at its top with a hand wheel or other device for operating it, and it is mounted in a stationary steering post 5, and in a stationary steering post bracket 6 of any approved construction, portions only of which are shown. The steering shaft is shown arranged vertically, but in operation it is generally arranged at an approved angle to the vertical. The hub of the steering wheel 7 bears on the top of the steering post and prevents the shaft from moving downwardly, but any other approved means may be used for that purpose.

A steering arm 8 is secured on the lower end portion of the steering shaft, and is preferably provided with a ball 9 at its free end for engaging with a spherical socket on the steering rod. The hub of the arm 8 is preferably secured on a tapering end portion of the shaft below the steering post bracket, by means of a nut 10 and a screwthreaded extension 12 on the shaft.

The steering post bracket is provided with a long cylindrical bearing 14 which has a screwthreaded portion 15 at its upper end.

A brass bush 16 is arranged in the lower part of the bearing 14, and has a head or enlargement 17 at its lower end which bears on the hub of the steering arm. This head provides a broad wearing surface for bearing against the said hub. A steel sleeve 18 is arranged in the upper end portion of the bearing 14, and has at its upper part a screwthreaded portion 19 which engages with the screwthreaded portion 15. The sleeve also has a rectangular or nut-shaped part 20 at its top for revolving it, arranged above the bracket, and the lower end of the sleeve bears on the upper end of the brass bush.

The steering shaft is arranged to rock or turn freely in the bush 16 and sleeve 18, and it is kept from vibrating by screwing down the sleeve onto the top end of the bush. This presses the head 17 like a brake against the hub of the steering arm, and the pressure is nicely regulated so that the steering shaft will turn freely and so that all vibration is prevented. The sleeve is screwed down from time to time as the parts become worn. The pressure of the head 17 on the hub also prevents oil from leaking out from the bearing bush around the shaft.

What I claim is:

1. In a steering mechanism, a steering shaft, a support for the steering shaft provided with a bearing, means which prevent the steering shaft from moving downwardly, a steering arm secured on the lower end of the steering shaft, a bush arranged in the said bearing around the steering shaft with its lower end bearing against the hub of the steering arm, and a longitudinally adjustable sleeve secured in the said bearing above the said bush and affording a means for pressing the bush against the said hub to take up wear and prevent vibration.

2. A steering mechanism as set forth in claim 1, the said bush having a head or enlargement on its lower end which affords a broad surface for bearing on the hub of the steering arm.

3. A steering mechanism as set forth in claim 1, the said sleeve being provided with a screwthreaded portion which is screwed into the upper part of the bearing, and a means for revolving the sleeve arranged above its screwthreaded portion.

In testimony whereof I have affixed my signature.

CHARLES E. BARNES.